US010721140B2

(12) United States Patent
Nyhus et al.

(10) Patent No.: US 10,721,140 B2
(45) Date of Patent: Jul. 21, 2020

(54) DYNAMIC SERVICE PROVISIONING SYSTEM AND METHOD

(71) Applicant: Level 3 Communications, LLC, Broomfield, CO (US)

(72) Inventors: Michael Nyhus, Denver, CO (US); James M. Adkins, III, Elizabeth, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 310 days.

(21) Appl. No.: 15/651,553

(22) Filed: Jul. 17, 2017

(65) Prior Publication Data

US 2018/0026857 A1 Jan. 25, 2018

Related U.S. Application Data

(60) Provisional application No. 62/364,543, filed on Jul. 20, 2016.

(51) Int. Cl.
*G06F 15/177* (2006.01)
*H04L 12/24* (2006.01)
(Continued)

(52) U.S. Cl.
CPC ...... *H04L 41/5051* (2013.01); *H04L 12/4679* (2013.01); *H04L 63/0876* (2013.01);
(Continued)

(58) Field of Classification Search
CPC ............. H04L 41/5051; H04L 12/4679; H04L 63/0876
(Continued)

(56) References Cited

U.S. PATENT DOCUMENTS 7,200,145 B1 * 4/2007 Edsall ................. H04L 12/4641
370/389
8,751,647 B1 * 6/2014 Yip ..................... H04L 12/4641
709/225
(Continued)

OTHER PUBLICATIONS

International Preliminary Report on Patentability, dated Jan. 22, 2019, Int'l Appl. No. PCT/US17/042392, Int'l Filing Date Jul. 17, 2017; 10 pgs.
(Continued)

*Primary Examiner* — Duyen M Doan

(57) ABSTRACT

A dynamic provisioning system includes a computer-executed portal that controls a router to, when a request message is received over a broadcast virtual local area network (VLAN), control the router to establish a dedicated VLAN between the customer communication device and the portal over a dedicated VLAN. The dedicated connection directing communication traffic from the customer computing device to the portal while inhibiting other communication traffic from the customer computing device. The portal also generates a user interface at the customer computing device using the dedicated connection in which the user interface to receive unique identifying information from the customer computing device. The portal also authenticates the customer computing device using the unique identifying information such that, when the customer computing device has been authenticated, receives selection of a communication service from the customer computing device, and establishes the selected communication service for the customer computing device.

20 Claims, 5 Drawing Sheets

(51) Int. Cl.
*H04L 12/46* (2006.01)
*H04L 29/06* (2006.01)
*H04L 29/08* (2006.01)
*H04W 12/06* (2009.01)

(52) U.S. Cl.
CPC ............. *H04L 67/20* (2013.01); *H04W 12/06* (2013.01); *H04L 41/5077* (2013.01); *H04L 2463/102* (2013.01)

(58) Field of Classification Search
USPC .................................................. 709/222–225
See application file for complete search history.

(56) References Cited

U.S. PATENT DOCUMENTS

| | | | |
|---|---|---|---|
| 9,025,533 | B1 | 5/2015 | Lok |
| 2004/0250117 | A1* | 12/2004 | Congdon ................. H04L 63/08 726/13 |
| 2006/0203815 | A1* | 9/2006 | Couillard ............ H04L 12/4641 370/389 |
| 2007/0268917 | A1* | 11/2007 | Wong .................... G06F 9/4416 370/401 |
| 2008/0016556 | A1 | 1/2008 | Selignan |
| 2009/0129386 | A1 | 5/2009 | Rune |
| 2010/0074261 | A1* | 3/2010 | Muhamed .......... H04L 12/4662 370/395.3 |
| 2012/0131097 | A1 | 5/2012 | Baykal et al. |
| 2012/0331142 | A1* | 12/2012 | Mittal .................. H04L 49/354 709/225 |
| 2013/0136138 | A1 | 5/2013 | Miller et al. |
| 2013/0201978 | A1 | 8/2013 | Iyer et al. |
| 2014/0119354 | A1 | 5/2014 | Verma |

OTHER PUBLICATIONS

International Search Report dated Sep. 26, 2017, Int'l Appl. No. PCT/US17/042392, Int'l Filing Date Jul. 17, 2017; 3 pgs.
Written Opinion of the International Searching Authority dated Sep. 26, 2017, Int'l Appl. No. PCT/US17/042392, Int'l Filing Date Jul. 17, 2017; 8 pgs.

* cited by examiner

DYNAMIC SERVICE PROVISIONING SYSTEM AND METHOD

CROSS REFERENCE TO RELATED APPLICATION

This application is related to and claims priority under 35 U.S.C. § 119(e) to U.S. Provisional Patent Application No. 62/364,543, filed Jul. 20, 2016, and entitled "Dynamic Service Provisioning System," the entire contents of which is incorporated herein by reference for all purposes.

TECHNICAL FIELD

Aspects of the present disclosure relate to communication networks and, in particular, to a dynamic service provisioning system and method of operating the same.

BACKGROUND

Many buildings include a telecommunication room where devices for providing voice and data services throughout the building are housed. One specific type of such room is referred to as a meet-me room (MMR) and it is a place where communications providers may physically connect their equipment to one another and exchange data without incurring local loop fees. Services provided across connections in an MMR may include voice services, data services, and/or Internet connectivity services. In many cases, communication service providers pre-position telecommunication equipment in a building, whether in a dedicate room such as a meet-me room or otherwise, so that the devices may be quickly provisioned to provide temporary services for customers who may occupy these buildings temporarily, such as what may be experienced by customers who may hold a convention or other gathering at or within a hotel, or firms that lease rather than purchase office space for their personnel.

SUMMARY

According to one aspect, a dynamic provisioning system includes a computer-executed portal that controls a router to, when a request message is received over a broadcast virtual local area network (VLAN), control the router to establish a dedicated VLAN between the customer communication device and the portal over a dedicated VLAN. The dedicated connection directing communication traffic from the customer computing device to the portal while inhibiting other communication traffic from the customer computing device. The portal also generates a user interface at the customer computing device using the dedicated connection in which the user interface to receive unique identifying information from the customer computing device. The portal also authenticates the customer computing device using the unique identifying information such that, when the customer computing device has been authenticated, receives selection of a communication service from the customer computing device, and establishes the selected communication service for the customer computing.

DETAILED DESCRIPTION

Figure 1A:
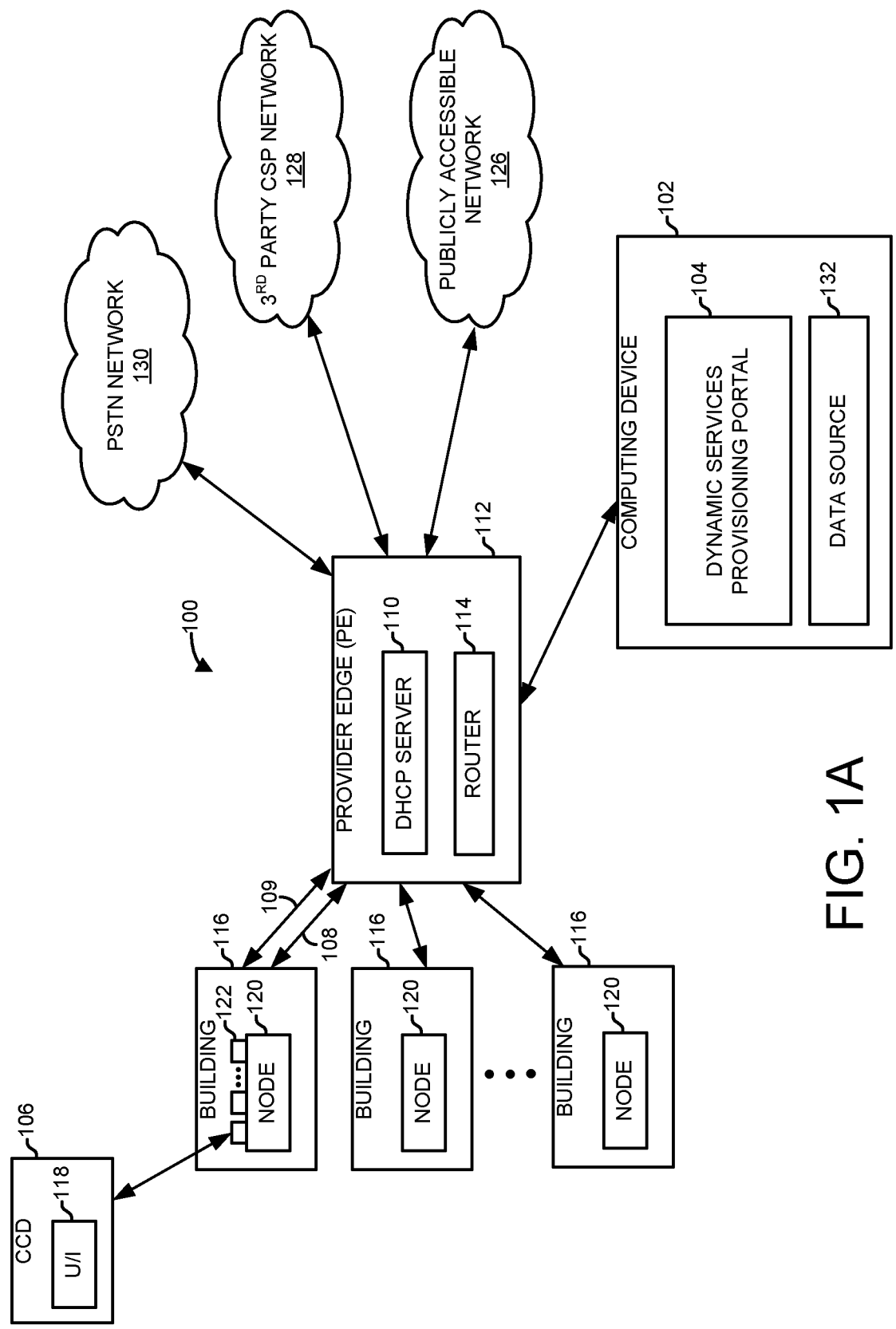
FIG. 1A is a block diagram of an example dynamic services provisioning system according to one aspect of the present disclosure.
Figure 1B:
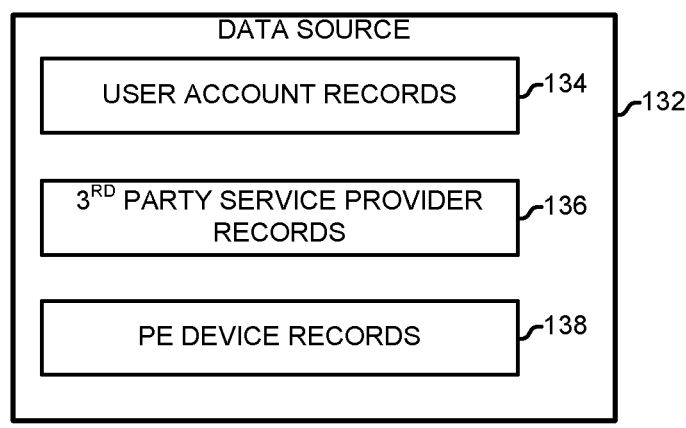
FIG. 1B illustrates an example data source that may be used to store information used by the dynamic services provisioning system according to one aspect of the present disclosure.

Embodiments of the present disclosure provide a provisioning portal through which one or more communication services may be dynamically provided to computing devices coupled to a VLAN at publicly accessible locations. Although communication services have been conventionally provided at publicly accessible locations using virtual private networks (VPNs), these VPNs are often layered over a public network (e.g., the Internet), which may suffer from inherent insecurities, and may exhibit bandwidth (BW) limitations based upon prevailing network conditions, such as congestion that may occur from time to time. Embodiments of the present disclosure provide a solution to this problem, among others, using a broadcast virtual local area network (VLAN) having ports provisioned in an active state such that, when a customer communication device is connected to a port of the broadcast VLAN, a dedicated VLAN to a portal is provided for the customer communication device so that the portal may authenticate the customer communication device, and authorize the dedicated VLAN to provide one or more communication services for that customer communication device. FIG. 1 illustrates an example dynamic services provisioning system 100 according to one embodiment of the present disclosure. The system 100 includes a computing device 102 that stores a dynamic services provisioning portal 104, which is executed to provide one or more communication services for a customer communication device (CCD) 106. As will be described in detail below, the portal 104 controls a provider edge (PE) device 112 to, when a request message is received over a broadcast virtual local area network (VLAN) 108, establish a dedicated VLAN 109 between the customer communication device 106 and the portal 104 over a dedicated VLAN 109. The dedicated VLAN 109 directs communication traffic from the customer computing device to the portal while inhibiting other communication traffic from the customer computing device. The portal 104 then generates a user interface 118 at the customer computing device 106 using the dedicated VLAN 109, and authenticates the customer computing device 106 using unique identifying information from the customer communication device 106. When the customer computing device 106 has been authenticated, the portal 104 receives selection of a communication service from the customer computing device 106, and establishes the selected communication service for the customer computing device 106.

In general, the VLAN 108 is provided through a network of communication nodes 120, which may be housed in one or more buildings 116 (e.g., or other structures) where communication services may be provided. Telecommunication equipment used to provide such services to portions (e.g., offices, meeting rooms, etc.) of a building are often housed in a dedicated room or rooms in the building. For example, office buildings often have a telecommunication room where telecommunication equipment is housed to provide services to the offices or rooms in the building. In many cases, telecommunication cabling, such as Ethernet cables, fiber, coaxial cabling, and the like, is routed from the telecommunication room to the rooms in the building so that users in the various rooms can connect a communication device to obtain a communication service. For example, a notebook computer may be connected to an Ethernet port in the room to obtain Internet service. Similarly, many modern hotels also include conference centers or meeting rooms where patrons may hold gatherings with multiple people.

Each node 120 includes one or more ports 122, which are typically each hard-wired to the telecommunication room. Conventionally, these ports 122 have been deactivated (e.g., turned off) when not used and are activated in response to a request by the customer. Activation in such scenarios often involve a technician traveling to the site and manually activating the port. In many cases, the ports are not initially activated to restrict undocumented use of the VLAN by would-be illicit users. For example, ports in unoccupied rooms of an office building are often not activated until an entity is actively leasing the space such that the communication services provided through the VLAN can be monitored and properly authenticated to provide legitimate use. Nevertheless, this conventional approach typically incurs delay due to manual provisioning required to provision each the ports 122. Embodiments of the present disclosure may provide certain advantages over these conventional techniques by enabling dynamic provisioning of the ports 122 so that users may be provided with communication services dynamically and on-demand that would otherwise require manual intervention to provide.

In general, the broadcast VLAN 108 provides initial connectivity between the customer communication device 106 and the portal 104. That is, the broadcast VLAN 108 provides for signaling of the customer communication device 106 to the portal 104 through the termination ports 122 of each node 120. Because each of the ports 122 have access to communications through the broadcast VLAN 108, it may be generally insecure. Therefore, the dedicated VLAN 109 may be provided to form a dedicated (e.g., captive) connection between the customer communication device 106 and the portal 104. The dedicated VLAN 109 comprises a special purpose VLAN that includes additional logic for ensuring secure communication between the customer communication device 106 and the portal 104. In one embodiment, the dedicated VLAN 109 may provide a secure connection using tags as specified according to a IEEE 802.1Q protocol.

The VLAN 108 is provisioned so that the ports 122 are always on. The ports 122 are provisioned so that when a customer communication device 106 initially connects to the port 122, a DHCP process is automatically initiated. For example, when the customer communication device 106 is initially coupled to the port 122, the customer communication device 106 may transmit a DHCP request as a broadcast message to a DHCP server 110 configured in the VLAN 108. Because the portal 104 is in communication with the port 122, it is able to detect the DHCP request and control the operation of the DHCP server 110 so that it only responds to the customer communication device 106 under the control of the portal 104. Thus, the dedicated VLAN 109 ensures that the customer communication device 106, once connected, is only allowed to access telecommunication services that are authorized by the portal 104. That is, the customer communication device 106 is inhibited from establishing a connection other than the portal 104 or a telecommunication service authorized by the portal 104.

Once the configuration parameters have been sent to the customer communication device 106, the portal 104 establishes a dedicated VLAN 109 between it and the customer communication device 106 using a router 114 in the PE device 112 and in one or more nodes 120 of the VLAN 108. That is, the customer communication device 106 at this point, is limited to communication with the portal 104 only using the dedicated VLAN established using the broadcast VLAN 108.

Once the dedicated VLAN is established, the portal 104 may then generate a user interface 118 on the customer communication device 106 to receive user input from a user of the customer communication device 106. For example, the portal 104 may use the user interface 118 to receive user credentials (e.g., user name and password) for an account that may have been previously established between the user and the communication service provider (CSP) that manages the VLAN 108. In some cases in which no account is available, the portal 104 may receive other forms of user credentials, such as credit card information that may be used to pay for the communication services to be provided to the customer communication device 106.

In one embodiment, the user interface 118 may include a webpage generated on a browser of the customer communication device 106. In some embodiments, one or more communication services may be provided to the customer communication device 106 without explicit selection of a particular communication service. For example, the customer communication device 106 may be configured with an executable agent application, which is installed on the customer communication device 106. The agent application may be configured to automatically sense when the customer communication device 106 is communicating with the portal 104, and communicates with the portal 104 via one or more specific API calls to establish one or more communication services for the customer communication device 106 without user intervention. For example, the agent application, may upon detecting that the customer communication device 106 is communicating with the portal 104, issue a request to the portal requesting a particular service (e.g., direct Internet access (DIA), phone service, etc.) to be provided by a third party CSP network 128.

Once the customer communication device 106 has been authenticated, the portal 104 may then display one or more communication service offerings on the user interface 118 for selection by the user. In one embodiment, a communication service that may be provided by the system 100 includes direct Internet access (DIA). If such a communication service is selected by the customer communication device 106, the portal 104 may assign the customer communication device 106 with a new IP address as compared to the IP address initially provided for the dedicated VLAN to bypass the VLAN 108 for, among other things, reducing congestion that could be caused due to large downloads. In another embodiment, a communication service that may be provided by the system 100 includes temporary managed services. These managed services can be ordered and temporarily provided to the customer communication device 106 or via on demand new virtual devices. Depending on the type of managed service, it can be used on the virtual devices for the life of the service or just until another permanent, dedicated device can be setup on site. The virtual boxes in the dedicated situation are provided temporarily until a technician or other person can be scheduled to provision the permanent managed service. In another embodiment, a communication service that may be provided by the system 100 includes provider supplied custom communication services, such as Level3 VPN services. Other communication services that may be provided by the system 100 include a Layer-2 Ethernet Service.

When the portal 104 receives selection of a particular communication service, it then provisions the VLAN to provide that communication service for the customer communication device 106; or when providing a DIA communication service, provision the router such that the customer communication device has direct access to the Internet without going through the VLAN. That is, the router may be configured with a routing entry that directs traffic between the customer communication device 106 and the publicly accessible network 126 directly, without going through the VLAN 108.

The VLAN 108 may include any communication domain that is partitioned and isolated within a communication network, for example, at the data link layer (e.g., open systems interconnection (OSI) layer 2) of the OSI communication stack. To form the broadcast VLAN, bridges are created using layer 2 addresses (e.g., MAC addresses) in the nodes 120. Using such a network topology provides a relatively secure communication structure that may be impervious to network congestion problems typically experienced by VPN network structures. As shown, the VLAN 108 includes multiple communication nodes 120 that are configured in multiple buildings 116 of a geographical area to provide communication services to people in those buildings 116. Nevertheless, it is contemplated that the communication nodes 120 may be configured at any location (e.g., a publicly accessible location) where managed communication services may be provided. Examples of such locations may include hotels where patrons may temporarily lease rooms, an office building where personnel may occupy offices within the office building, and an airport or other venue where users may obtain temporary access to certain communication services.

Dynamic provisioning of communication services is provided through a routing device, such as the PE router 114. In general, the PE device 112 provides a termination port 122 (e.g., termination point) to a customer communication device 106 owned and administrated by a customer of the system 100. Each port 122 generally denotes a termination point at which the route is handed off to the Customer communication device 106. That is, the termination port 122 denotes a certain point in the VLAN 108 at which responsibility for the proper operation of the communication service provided by the customer service provider ends and which responsibility for the customer begins. The nodes 120 may relay communication services for other nodes 120 through the VLAN 108. Although the particular VLAN 108 as shown and described herein merely described a simplified example, it should be understood that an actual network deploying the concepts described herein may employ numerous nodes and PE routers not specifically shown and described herein.

Any suitable type of communication service may be provided by the system 100. For example, the system 100 may provide a publicly accessible network access communication service for a customer communication device 106 by routing traffic from the customer communication device 106 to a publicly accessible network 126, such as the Internet. Moreover, the Internet may be accessed through the dedicated VLAN 109, or through a DIA in which case the customer communication device 106 accesses the Internet without the dedicated VLAN 109. As another example, the system 100 may provide a third party CSP communication service for the customer communication device 106 by routing traffic from the customer communication device 106 to a third party CSP network 128. As yet another example, the system 100 may provide a public switched telephone network (PSTN) communication service for the customer communication device 106 by routing traffic from the customer communication device 106 to a PSTN network 130, such as one managed by a local telephone service.

The customer communication device 106 may be any type that is configured to communicate with the VLAN 108 using protocols established for the portal 104. For a VLAN functioning according to an Internet protocol (IP) based network domain, the customer communication device 106 communicates with other customer communication devices by transmitting and receiving IP based packets that are routed through the broadcast VLAN 108. The customer communication device 106 has one or more processors and executable instructions stored in volatile and/or non-volatile memory for performing the actions and/or steps described herein.

The customer communication device 106 and the portal 104 may communicate with one another using a communications network. Nevertheless, the customer communication device 106 and the portal 104 may communicate with one another in any suitable manner. For example, the customer communication device 106 and the portal 104 may communicate with each other using wireless, wired, and/or optical communications. In one specific embodiment, the customer communication device 106 and the portal 104 communicates with one another using a communication network, such as the Internet, an intranet, or other wired and/or wireless communication networks. In another embodiment, the customer communication device 106 and the portal 104 communicate using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the systems may communicate without the use of a separate or a distinct network.

The computing device 102 includes a data source 132 that stores user account records 134, third party communications service provider records 136, and PE device address records 138. The user account records 134 may be used by the portal 104 to associate a particular customer communication device 106 with an account that may be established for a user of the customer communication device 106. The third party CSP records 136 may be used by the portal 104 to access a communication service provided by a third party CSP network 128. For example, the third party CSP records 136 may include information associated with a particular network address of a gateway to a third party CSP network 128 that provides a desired communication service. The PE device records 138 store information about the PE device 138, such as its network address, capabilities, routing table information, certain communication services that may be restricted from use in the VLAN 108, and the like.

Figure 2:
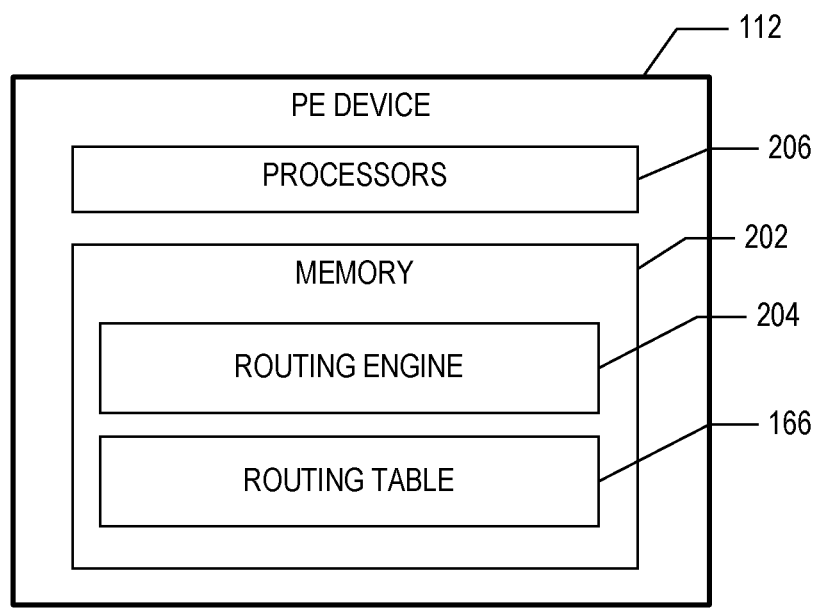
FIG. 2 illustrates an example provider edge (PE) device that may be used by the system according to one embodiment of the present disclosure.

FIG. 2 illustrates an example PE device 112 that may be used by the system 100 according to one embodiment of the present disclosure. The PE device 112 includes a memory 202 for storing a routing engine 204 that is executed by one or more processors 206 to establish routes between the customer communication device 106 and the a destination address associated with a communication service to be provided for the customer communication device 106 using a routing table 208$n$ one example, the routing engine 204 may establish routes within the VLAN 108 and provide the communication services using a network layer (e.g., layer 3) of the OSI communication stack.

Figure 3:
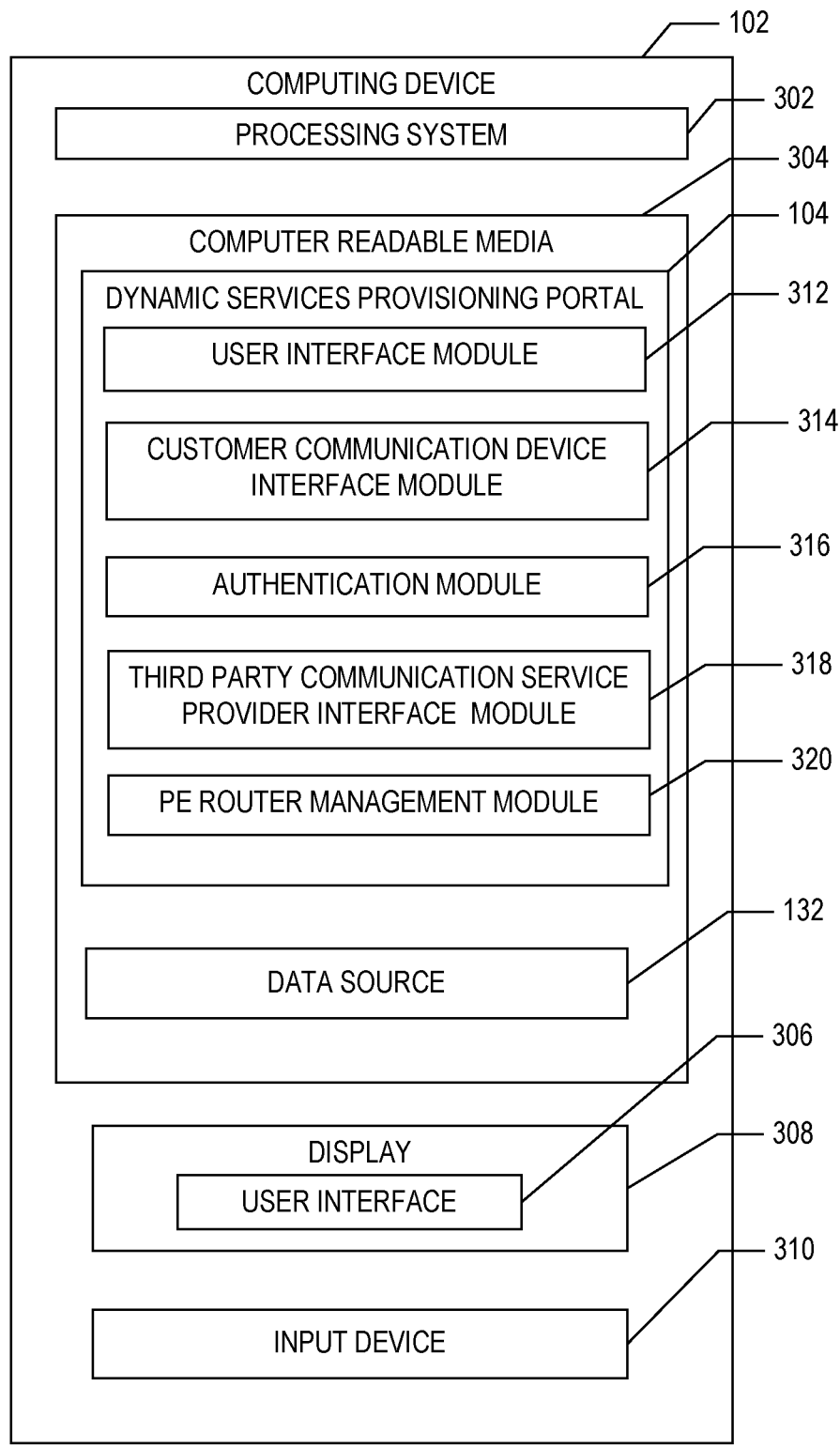
FIG. 3 is a block diagram depicting an example dynamic services provisioning portal executed on the computing device according to one embodiment of the present disclosure.

FIG. 3 is a block diagram depicting an example dynamic services provisioning portal 104 executed on the computing device 102 according to one embodiment of the present disclosure. The computing device 102 includes a processing system 302 that includes one or more processors or other processing devices. A processor is hardware. Examples of such a computing device include one or more servers, personal computers, mobile computers and/or other mobile devices, and other computing devices. The network analysis computing system 102 may communicate with the PE device 112 and/or the customer communication device 106 via wireless, wired, and/or optical communications.

According to one aspect, the computing system 102 includes a tangible and non-transient computer readable media 304 on which the portal 104, in the form of computer executable instructions, and data source 132 are stored. The portal 104 includes instructions or modules that are executable by the processing system 302 to perform the features of the data network analysis system 100 described herein. The computer readable media 304 is tangible and may include volatile media, nonvolatile media, removable media, non-removable media, and/or another available media that can be accessed by the computing device 102.

According to one aspect, the computing system 102 may include a user interface 306 displayed on a display 308, such as a computer monitor, for displaying data. The computing device 102 may also include an input device 310, such as a keyboard or a pointing device (e.g., a mouse, trackball, pen, or touch screen) to enter data into or interact with the user interface 306. According to one aspect, the portal 104 includes instructions or modules that are executable by the processing system 302 as will be described in detail herein below.

A user interface module 312 facilitates the receipt of input data and/or output data from or to a user (e.g., an administrator), respectively, for manipulating the operation of the portal 104. In one example, the user interface module 312 may receive user input for manipulating or otherwise modifying how communication services are to be provided for each customer communication device 106 or for certain types of customer communication devices 106 that use the system 100. For example, the user interface module 312 may interact with the user to receive information for diagnosing and fixing problems that may occasionally arise with the operation of the system 100.

A customer communication device interface module 314 communicates with a customer communication device 106 to obtain information for establishing a communication service for the customer communication device 106, deleting the communication service at the completion of the communication service, and/or providing information to the user of the customer communication device 106. For example, the customer communication device interface module 314 may generate a graphical user interface (GUI) on the user interface 118 (e.g., a webpage generated on a web browser of the customer communication device 106) of the customer communication device 106 to display optional communication services that may be provided for the customer communication device 106, and receive information in connection with a communication service selected by the user via the user interface 118 of the customer communication device 106.

An authentication module 316 authenticates the customer communication device 106 for use with system 100. In general, the authentication module 316 ensures that the customer communication device 106 is allowed to use the portal 104, and if so, processes information provided about the customer communication device 106 to establish the communication service for the customer communication device 106. For example, when a user of the customer communication device 106 has an established account with an administrator of the system 100, the authentication module 314 may access account information associated with the customer communication device 106 to determine what type and level of communication services may be provided for the customer communication device 106. In cases where no established account for the customer communication device 106 exists, the authentication module 314 may conduct a financial transaction with the user of the customer communication device 106 for receiving monetary compensation for providing the communication service to the customer communication device 106. For example, the authentication module 314 may receive credit card information from the customer communication device 106, and using the credit card information, communicate with a server associated with the credit card provider to conduct the financial transaction for providing the service.

A third party communication service provider interface module 318 communicates with the third party CSP network 128 to obtain service account information 144 associated with a particular route provided to a customer. For example, the third party CSP may have an administration, authentication, and accounting (AAA) server of the third party CSP network 128 that stores information associated with any agreed upon communication services to be provided by for the customer by the third party CSP. Thus, when user information is obtained via the dedicated VLAN, such as a particular communication service to be provided by a third party CSP, the third party communication service provider interface module 318 may access the AAA server associated with that third party CSP to authenticate and authorize the selected communication service for the customer communication device 106. Additionally, the third party communication service provider interface module 318 may communicate with the authentication module 314 to conduct a financial transaction with the third party CSP for receiving monetary compensation for accessing the third party communication network through the VLAN 108 provided by the administrators of the VLAN 108.

A PE device management module 320 manages the operation of the PE device 112 to provide the communication services for the customer communication device 106. For example, the PE device management module 320 may receive information associated with a newly established dynamic address established by the DHCP server 110, and using that information, communicate with the router 114 to establish a dedicated VLAN between the customer communication device 106 and the portal 104. The PE device management module 320 may also communicate with the authentication module and/or the third party CSP interface module 318 to establish credentials for the customer communication device 106, and based upon those credentials, control the router 114 to establish one or more routing table entries for providing the selected communication service for the customer communication device 106. For example, the PE device management module 320 may receive computer-specific unique identifying information associated with the customer communication device 106, and using this information, access the user account records 134 to determine whether the user of the customer communication device 106 has an account established with the administrator of the system 100. If so, the PE device management module 320 may then access account information provided by the user account records 134 to determine what types of level of communication services that may be provided with that account. In one embodiment, the PE device management module 320 may receive information from the customer communication device 106 indicating that the user of the customer communication device 106 desires to access It should be appreciated that the modules described herein are provided only as an example of a computing device that may execute the dynamic services provisioning portal 104 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as the PE device configured in the VLAN 108.

Figure 4:
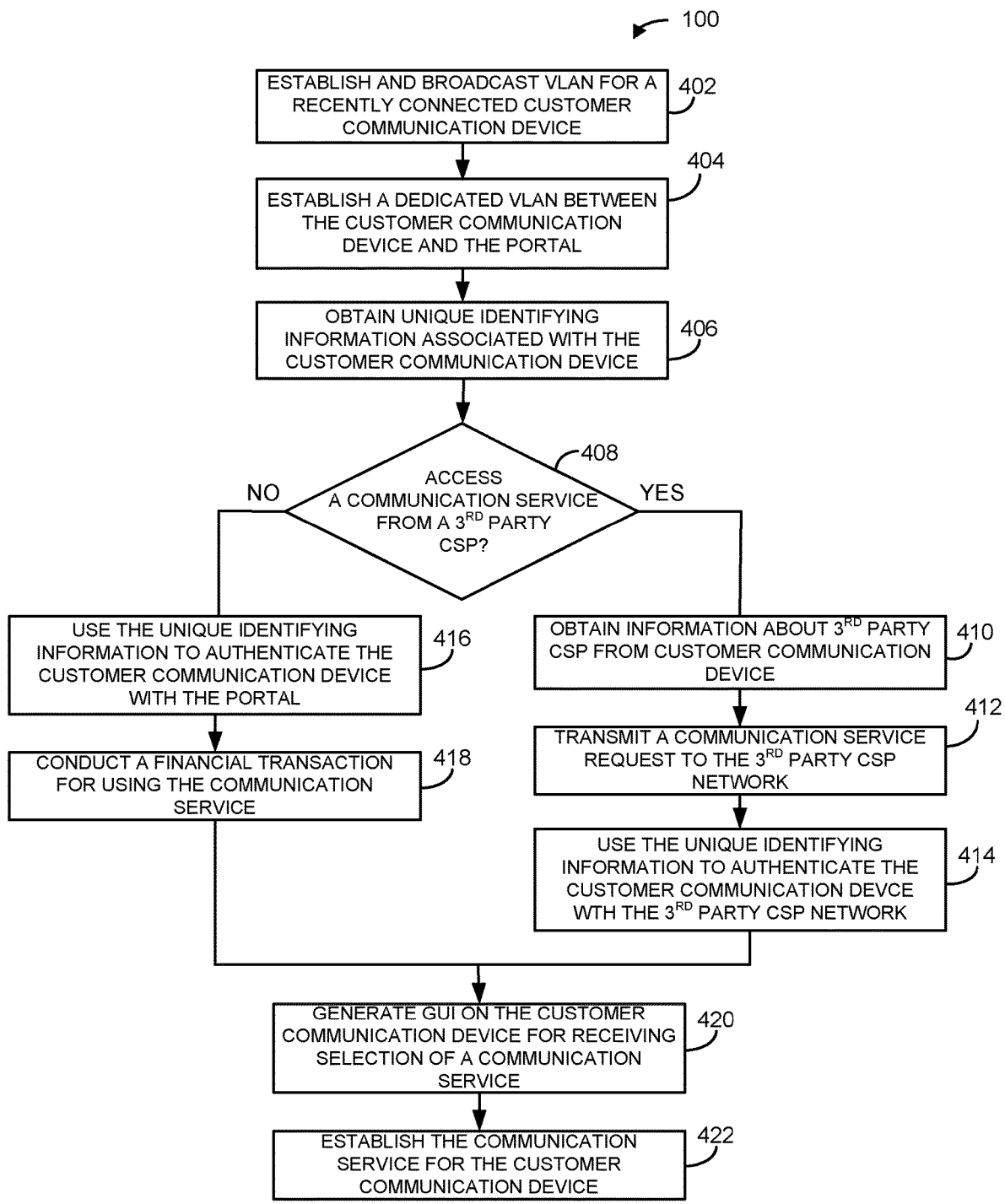
FIG. 4 illustrates an example process that may be performed by the system to provide one or more communication services for a customer communication device according to one embodiment of the present disclosure.

FIG. 4 illustrates an example process 400 that may be performed by the system 100 to provide one or more communication services for a customer communication device according to one embodiment of the present disclosure. Initially, the VLAN 108 is configured and at least one of the ports 122 of a communication node 120 are activated (e.g., turned on), but not device is connected to the port 122.

At step 402, the portal 104 controls the router 112 to establish a broadcast VLAN 108 using the port 122 to which the customer communication device 106 is coupled. In some cases, the router 112 may assign a dynamic address for a customer communication device 106 when the device is coupled to the port 122 according to the DHCP protocol. Thereafter at step 404, the portal 104 creates a dedicated VLAN 109 between the customer communication device 106 and the portal 104 using the dynamic address information provided to the customer communication device 106 using the DHCP protocol. The dedicated VLAN 109 may be established in any suitable manner. In one embodiment, the dedicated VLAN 109 may be established using tags as specified according to the IEEE 802.1Q protocol.

At step 406, the portal 104 may obtain unique identifying information associated with the customer communication device 106. For example, the portal 104 may obtain receive computer-specific identifying information from the customer communication device 106 that uniquely identifies that customer communication device 106 from among other customer communication devices 106. As another example, the portal 104 may generate a user interface 118 on the customer communication device 106 to receive user entry of a username/passcode combination or other manual authentication means from the user of the customer communication device 106 that uniquely identifies that user from among other potential users of the portal 104.

At step 408, if the customer communication device 106 is to access a communication service from a third party CSP network 128, processing continues at step 410; otherwise, processing continues at step 416.

At step 410, the portal 104 obtains information about the third party communication service requested from the customer communication device 106. For example, the portal 104 may obtain information associated with a particular brand name of third party CSP (e.g., ACME telecommunications Corporation) from the user interface 118 of the customer communication device 106 and use the brand name to lookup addressing information for the gateway of a third party CSP network 128 stored in the third party CSP records 136. In some cases, if a record 136 is not found for the brand name of the third party CSP, the portal 104 may generate another user interface 118 on the customer communication device 106 to obtain explicit addressing information for the gateway of the third party CSP network 128.

At step 412, the portal 104, using the obtained gateway address information, transmits a communication service request to the gateway of the third party CSP network 128. In one embodiment, the gateway of the third party CSP network 128 may function as an AAA server or forward the request to an AAA server in the third party CSP network 128 to authenticate the communication service request, authorize the communication service request, and/or provide accounting services for the communication request, such as by conducting a financial transaction to receive monetary compensation for providing the communication service. In one embodiment, the portal 104 may communicate with the third party CSP network 128 to facilitate a financial transaction so that the administrator of the portal 104 may receive monetary compensation for providing access to the third party CSP network 128 by the customer communication device 106.

At step 414, the portal 104 uses the unique identifying information to authenticate the customer communication device 106 with the portal 104. For example, the portal 104 may search through the user account records 134 stored in the data source 132 to determine whether the user of the customer communication device 106 has an established account with the administrator of the portal 104. If so, the customer communication device 106 may be authenticated using the user account information stored in the user account records 134. However, if no user account information is found, the portal 104 may conduct a transaction for the communication service, or communicate with an external system (e.g., a credit card transaction server).

At step 420, the portal 104 generates the user interface 118 on the customer communication device 106 for receiving selection of a communication service from the customer communication device 106. When selection of the desired communication service is received, the portal 104 then establishes the communication service for the customer communication device 106 at step 422. The communication service may be established in any desired manner. In one embodiment, the portal 104 may generate a routing entry in the routing table 208 of the router 114 that directs traffic from the customer communication device 106 to the desired communication service using the dedicated VLAN 109. For example, a routing entry may be generated to direct traffic from the customer communication device 106 to a gateway of a publicly available network 126, such as the Internet. As another example, a routing entry may be generated to direct traffic from the customer communication device 106 to an Ethernet gateway of the PSTN network 130.

The steps associated with establishing a communication service for the customer communication device 106 that is not associated with any third party CSP network 128 will now be described. Examples of such cases may include one where the customer communication device 106 does not have an established contract with any third party CSP network 128 that can be accessed by the portal 104.

At step 416, the portal 104 uses the unique identifying information to authenticate the customer communication device 106 with the portal 104. For example, the portal 104 may access the user account records 134 to obtain account information for the user and if not, access the PE device records 138 to obtain default communication services that may be provided to those customer communication devices 106 without an active account. Thereafter at step 418, the portal 104 conducts a financial transaction for providing the requested communication service for the customer communication device 106. For example, the portal 104 may conduct a transaction for the communication service using a credit card transaction server associated with the user of the customer communication device 106 to provide monetary compensation for use of the communication service.

The process described above continues throughout operation of the portal 104 for establishing other additional communication services for the same customer communication device 106 or another customer communication device 106 coupled to the dedicated VLAN 109. Nevertheless, when use of the dynamic services provisioning portal 104 is no longer needed or desired the process ends.

It should be appreciated that the process described herein is provided only as an example and that the dynamic services provisioning portal 104 may execute additional steps, fewer steps, or differing steps than those described herein. For example, the steps 402 through 422 may be executed in any suitable order; that is, the steps as described in FIG. 4 are not limited to execution in any particular sequence. As another example, either of the steps 402 through 422 described herein may be executed by another computing device, such as by the PE device 112 or other node in communication with the VLAN 108 without departing from the spirit or scope of the present disclosure.

Figure 5:
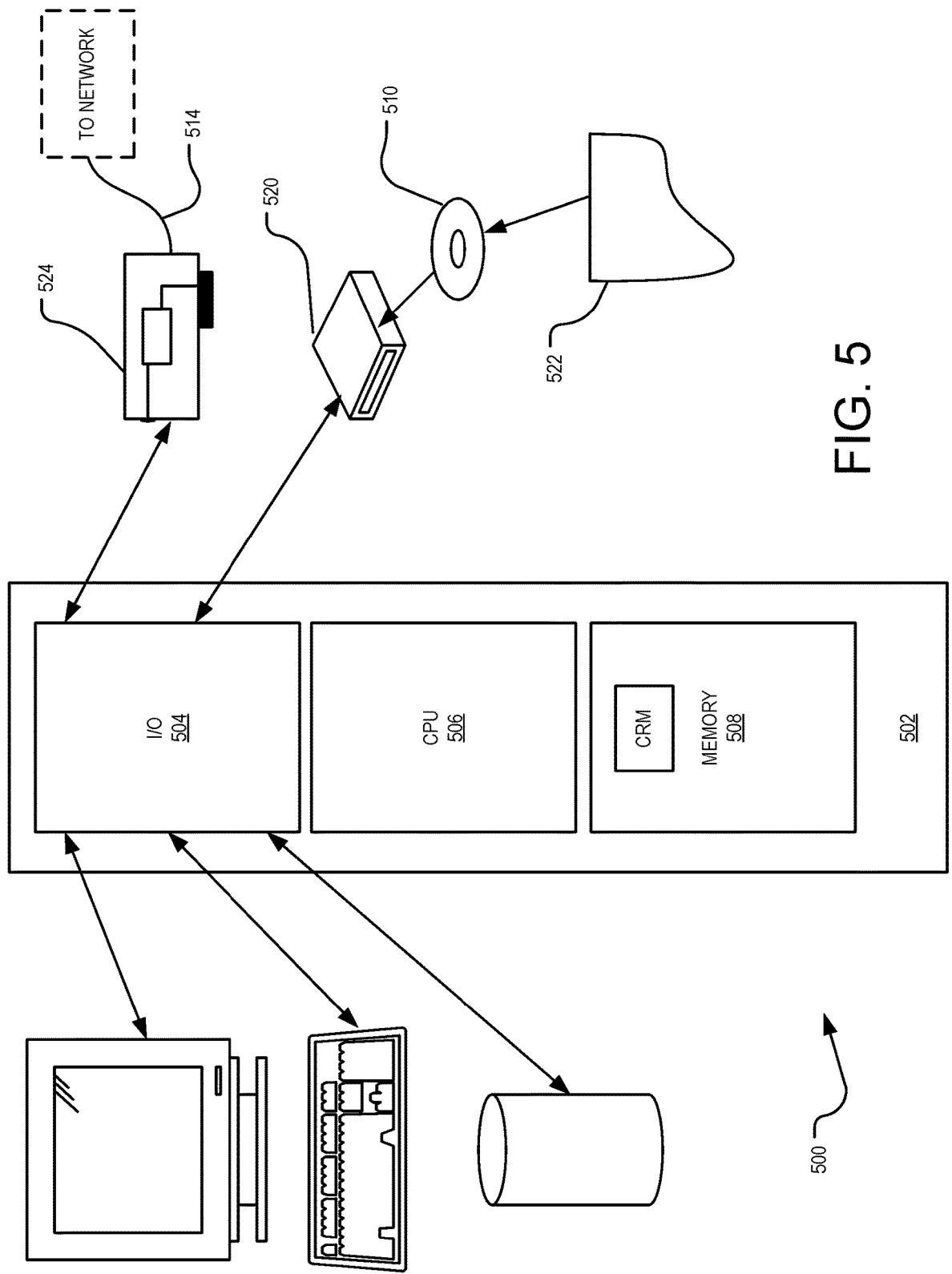
FIG. 5 illustrates an example of a computing system that may implement various systems and methods discussed herein.

FIG. 5 illustrates an example computing system 500 that may implement various systems discussed herein. A general purpose computer system 500 is capable of executing a computer program product to execute a computer process. Data and program files may be input to the computer system 500, which reads the files and executes the programs therein such as the application 504. Some of the elements of a general purpose computer system 500 are shown in FIG. 5 wherein a processing system 502 is shown having an input/output (I/O) section 504, a hardware central processing unit (CPU) 506, and a memory section 508. The processing system 502 of the computer system 500 may have a single hardware central-processing unit 506 or a plurality of hardware processing units. The computer system 500 may be a conventional computer, a server, a distributed computer, or any other type of computing device, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, nonvolatile media, removable media, non-removable media, and/or other hardware media or hardware mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 504 is connected to one or more optional user-interface devices (e.g., a user interface such as a keyboard 516 or the user interface 512), an optional disc storage unit 512, an optional display 518, and an optional disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 508, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by a tape drive unit, or other storage medium drive unit. An optional network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, source code executed by the portal 104, a plurality of internal and external databases optionally are stored in memory of the portal 104 or other storage systems, such as the disk storage unit 512 or the DVD/CD-ROM medium 510, and/or other external storage devices made available and accessible via a network architecture. The source code executed by the portal 104 may be embodied by instructions stored on such storage systems and executed by the processing system 502.

Some or all of the operations described herein may be performed by the processing system 502, which is hardware. Further, local computing systems, remote data sources and/or services, and other associated logic represent firmware, hardware, and/or software configured to control operations the system 100 and/or other components. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A dynamic provisioning system comprising:
a computing device comprising at least one processor and at least one memory to store a portal that is executed by the at least one processor to:
control a router to, when a request message is received over a broadcast virtual local area network (VLAN), establish a dedicated VLAN between a customer communication device and a portal over the dedicated VLAN, the dedicated VLAN directing communication traffic from the customer communication device to the portal, and wherein the dedicated VLAN includes logic for ensuring secure communication between the customer communication device and the portal;
inhibit the customer communication device from establishing a connection for communication traffic other than the connection made to the portal using the established dedicated VLAN;
generate a user interface at the customer communication device using the dedicated VLAN, the user interface to receive unique identifying information from the customer communication device;
authenticate the customer communication device using the unique identifying information;
when the customer communication device has been authenticated, receive selection of a communication service from the customer communication device; and
establish the selected communication service for the customer communication device.

2. The dynamic provisioning system of claim 1, wherein the portal is further executed to identify a third party service provider that provides the selected communication service, and communicate with a server associated with the third party service provider to authenticate the customer communication device, and establish the communication service for the customer communication device, the communication service established using the dedicated VLAN.

3. The dynamic provisioning system of claim 1, wherein the portal is further executed to control the router to inhibit the other communication traffic by establishing the dedicated VLAN according to an IEEE 802.1Q protocol.

4. The dynamic provisioning system of claim 1, wherein the dedicated VLAN is generated in response to a DHCP request message issued by the customer communication device, the DHCP request message issued in response to being physically connected to a port of a node in communication with the VLAN.

5. The dynamic provisioning system of claim 1, wherein the dedicated VLAN is provisioned on a node that is disposed in a publicly accessible building, the node comprising a port that is used to communicatively couple the customer communication device to the portal.

6. The dynamic provisioning system of claim 1, wherein the router comprises a provider edge (PE) server of the VLAN.

7. The dynamic provisioning system of claim 1, wherein the communication service comprises at least one of a direct Internet access (DIA), a temporary managed service, and an Layer-2 Ethernet Service.

8. A dynamic provisioning method comprising:
controlling, using instructions stored on at least one computer-readable medium and
executed by at least one processor, a router to, when a request message is received over a broadcast virtual local area network (VLAN), control the router to establish a dedicated VLAN between a customer communication device and a portal over a dedicated VLAN, the dedicated VLAN directing communication traffic from the customer communication device to the portal, and wherein the dedicated VLAN includes logic for ensuring secure communication between the customer communication device and the portal;

inhibiting the customer communication device from establishing a connection for communication traffic other than the connection made to the portal using the established dedicated VLAN;

generating, using the instructions executed by the at least one processor, a user interface at the customer communication device using the dedicated VLAN, the user interface to receive unique identifying information from the customer communication device;

authenticating, using the instructions executed by the at least one processor, the customer communication device using the unique identifying information;

when the customer communication device has been authenticated, receiving, using the instructions executed by the at least one processor, selection of a communication service from the customer communication device; and establishing, using the instructions executed by the at least one processor, the selected communication service for the customer communication device.

9. The dynamic provisioning method of claim 8, further comprising identifying a third party service provider that provides the selected communication service, and communicate with a server associated with the third party service provider to authenticate the customer communication device, and establish the communication service for the customer communication device, the communication service established using the dedicated VLAN.

10. The dynamic provisioning method of claim 8, further comprising controlling the router to inhibit the other communication traffic by establishing the dedicated VLAN according to an IEEE 802.1Q protocol.

11. The dynamic provisioning method of claim 8, wherein the dedicated VLAN is generated in response to a DHCP request message issued by the customer communication device, the DHCP request message issued in response to being physically connected to a port of a node in communication with the VLAN.

12. The dynamic provisioning method of claim 8, wherein the dedicated VLAN is provisioned on a node that is disposed in a publicly accessible building, the node comprising a port that is used to communicatively couple the customer communication device to the portal.

13. The dynamic provisioning method of claim 8, wherein the router comprises a provider edge (PE) server of the VLAN.

14. The dynamic provisioning method of claim 8, wherein the communication service comprises at least one of a direct Internet access (DIA), a temporary managed service, and an Layer-2 Ethernet Service.

15. A non-transitory computer readable medium including computer executable instructions for performing the steps of:

when a request message is received over a broadcast virtual local area network (VLAN), controlling a router to establish a dedicated VLAN between a customer communication device and a portal over a dedicated VLAN, the dedicated VLAN directing communication traffic from the customer communication device to the portal, and wherein the dedicated VLAN includes logic for ensuring secure communication between the customer communication device and the portal;

inhibiting the customer communication device from establishing a connection for communication traffic other than the connection made to the portal using the established dedicated VLAN;

generating a user interface at the customer communication device using the dedicated VLAN, the user interface to receive unique identifying information from the customer communication device;

authenticating the customer communication device using the unique identifying information;

when the customer communication device has been authenticated, receiving selection of a communication service from the customer communication device; and establishing the selected communication service for the customer communication device.

16. The non-transitory computer readable medium of claim 15, the computer executable instructions for performing the steps of:

identifying a third party service provider that provides the selected communication service, and communicate with a server associated with the third party service provider to authenticate the customer communication device; and establishing the communication service for the customer communication device, the communication service established using the dedicated VLAN.

17. The non-transitory computer readable medium of claim 15, the computer executable instructions for performing the step of: controlling the router to inhibit the other communication traffic by establishing the dedicated VLAN according to an IEEE 802.1Q protocol.

18. The non-transitory computer readable medium of claim 15, wherein the dedicated VLAN is generated in response to a DHCP request message issued by the customer communication device, the DHCP request message issued in response to being physically connected to a port of a node in communication with the VLAN.

19. The non-transitory computer readable medium of claim 15, wherein the dedicated VLAN is provisioned on a node that is disposed in a publicly accessible building, the node comprising a port that is used to communicatively couple the customer communication device to the portal.

20. The non-transitory computer readable medium of claim 15, wherein the router comprises a provider edge server of the VLAN.

* * * * *